Figure 6:
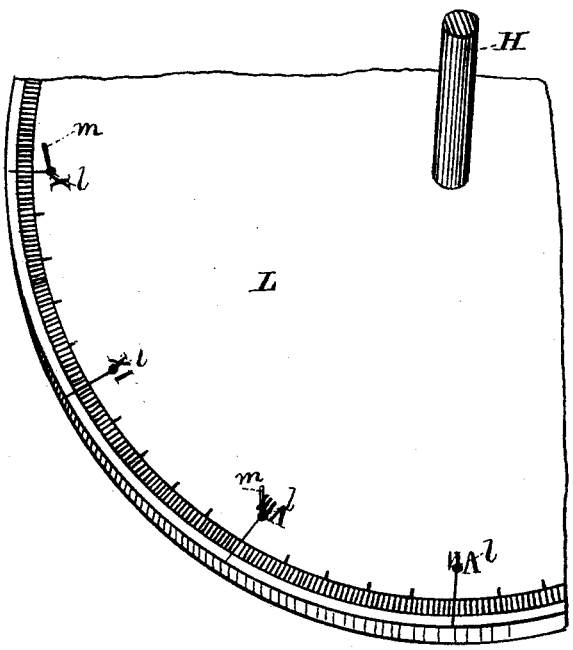

(No Model.) 3 Sheets—Sheet 1.
A. JACKSON.
AUTOMATIC TIME GLOBE.
No. 273,092. Patented Feb. 27, 1883.
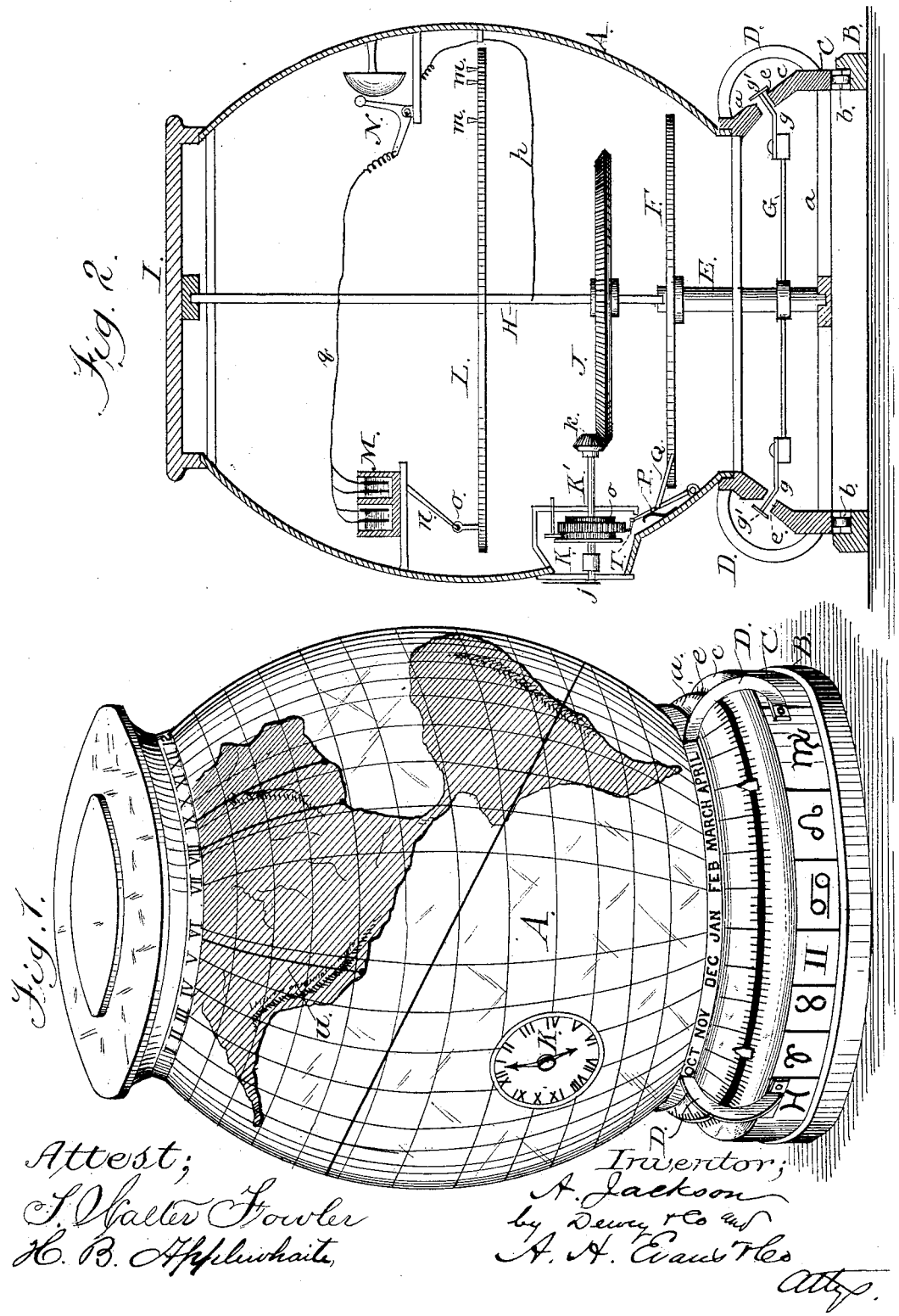

(No Model.) 3 Sheets—Sheet 2.
A. JACKSON.
AUTOMATIC TIME GLOBE.
No. 273,092. Patented Feb. 27, 1883.
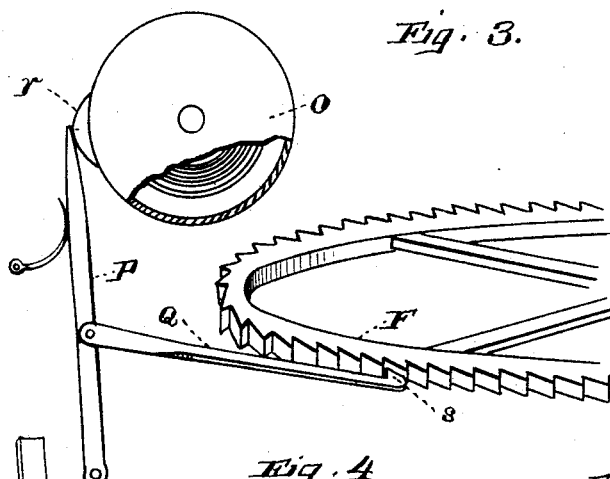
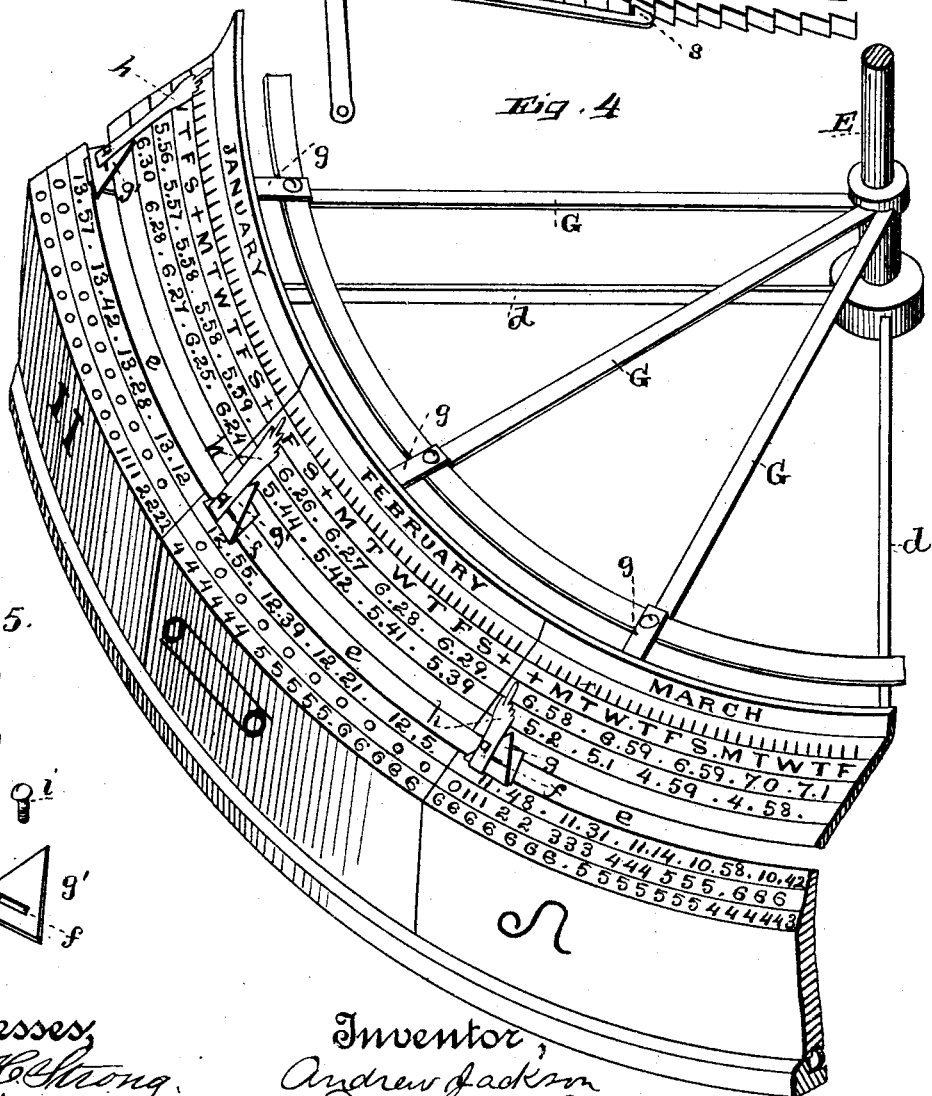
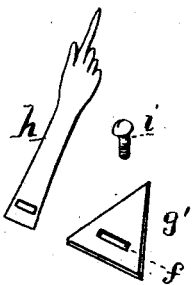
Witnesses,
Geo. H. Strong
L. H. Nourse
Inventor,
Andrew Jackson
By Dewey & Co.
Attorneys (No Model.)  3 Sheets—Sheet 3.

A. JACKSON.
AUTOMATIC TIME GLOBE.

No. 273,092. Patented Feb. 27, 1883.

Witnesses,
Geo. H. Strong.
S. H. Nourse.

Inventor
Andrew Jackson
By Dewey & Co.
Attorneys

UNITED STATES PATENT OFFICE.

ANDREW JACKSON, OF SAN FRANCISCO, CALIFORNIA.

AUTOMATIC TIME-GLOBE.

SPECIFICATION forming part of Letters Patent No. 273,092, dated February 27, 1883.

Application filed May 27, 1882. (No model.)

*To all whom it may concern:*

Be it known that I, ANDREW JACKSON, of the city and county of San Francisco, State of California, have invented an Improved Astronomical and Geographical Automatic Time Chart and Globe; and I hereby declare the following to be a full, clear, and exact description thereof.

My invention relates to a novel astronomical and geographical automatic time chart and globe; and it consists in a peculiar terrestrial globe upon the base of which is marked distinct series of lines representing a general calendar, as the various divisions of time, the position and movement of the sun, and its effect upon the length of day and difference between mean and sun time, and others of like nature, while its top is provided with a revolving cap upon which is marked the divisions of hours, up to twenty-four, to make the day. The interior of the globe is provided with peculiar gearing operated by the mechanism of a clock, the face of which is exhibited upon the face of the globe. This gearing is connected with a disk upon the rim of which are secured adjustable pointers projecting through a circumferential slot in the base of the globe and adapted to be directed by the revolution of the disk to the successive divisions in the various series marked thereon. The gearing is also connected with an electric alarm, and is so constructed as to operate at any desired periods or divisions of time. The particular construction and operation of this mechanism, together with the manner of marking the globe and its use, will hereinafter fully appear.

The object of my invention is to provide a simple and economical globe for the use of schools, by which a number of facts and results and their causes may be readily demonstrated and easily acquired, and at the same time provide for its automatic action, and thereby in addition furnish an alarm for calling attention to any desired time or times.

Referring to the accompanying drawings, Figure 1 is a perspective. Fig. 2 is a vertical section. Fig. 3 is an enlarged detail of mechanism operating gear F. Fig. 4 is a perspective of the calendar and pointers. Fig. 5 is a detail of pointers. Fig. 6 is a detail of plate L.

Let A represent the globe. This, instead of being a perfect globe, spherical in form, is preferably made, as shown, more in the shape of a barrel. Its lower or base end is made with or rests in a flaring flange, $a$.

Let B represent a circular track, upon which is mounted on rollers $b$ a ring, C, with an inwardly-inclined flange, $c$, at its top.

D D are semicircular arms or brackets, the ends of which are secured to the flange C and to the flange $a$ of globe A. These support the globe above the ring and a little separated therefrom to leave a space or circumferential slot, $e$, between the edges of the two flanges $a$ and $c$. In the ring C is a cross-piece, $d$, in a step in which is journaled a vertical shaft, E, carrying at its top a large gear-wheel, F, which is to have three hundred and sixty-five teeth. The shaft E also carries a disk or plate, G, to the rim of which, in various places, as will hereinafter be explained, are screwed arms $g$, the ends of which project outwardly through the slot $e$ and carry small heads or plates $g'$. In these plates are made horizontal slots $f$, (see Figs. 4 and 5,) and upon them lie pointers $h$, also provided with slots, through which and through slots $f$ set-screws $i$ pass to fix the pointers. These pointers travel over the faces of flanges $a$ and $c$, and may be adjusted upon the plates a sufficient distance from either side, forward or back, for the purpose hereinafter described.

In the top of shaft E is a step, in which a vertical shaft, H, is journaled. This extends to the top of the globe, and carries upon its top a cap, I, which fits over the top of the globe and is adapted to turn thereon. The shaft H carries a bevel-gear wheel, J, driven by a pinion, $k$, upon the end of shaft K', which carries and moves the minute-hand $j$ of the clock K, secured to the side of the globe, and having its face showing upon the outside, as seen in Fig. 1. The pinion $k$ and the bevel-gear wheel J are each provided with sufficient number of teeth to cause the former to revolve the latter completely once in twenty-four hours, by which means the cap I upon top of the globe makes one revolution in twenty-four hours. The shaft H carries a large plate or disk, L, around the outer edge of which are made a number of sockets or holes, $l$, Fig. 6. The disk is divided by a number of lines, as shown, into hours and fractions thereof similar to the dial of a clock, and the holes $l$ are made in places indicated by these divisions. Into any of these holes are to be placed platinum points m.

Upon the inside of the globe, at one side, is a shelf, upon which is a small battery, M. Upon the other side is any form of an alarm, as a gong and striker. (Represented by N.) From one pole of the battery is a metal arm, n, carrying in its end a platinum point, o, in such position that the points m in the disk L will come in contact with it in their revolution. Leading from the alarm N to the metal shaft H is a wire, p, while another wire, q, leads from the alarm to the battery. When the points m and o come in contact the circuit is complete and the alarm is sounded.

To drive the gear F, I have the following mechanism. Let O represent the drum or box in which the spring operating the striking mechanism of the clock K is inclosed, Figs. 2 and 3. This spring, in unwinding, is adapted to turn the drum O one complete revolution in twenty-four hours. Upon the drum I form a projection, r, which, by the revolution of the drum, is adapted to come in contact once in twenty-four hours, at midnight, with the upper end of a lever, P, pivoted at its lower end. This lever has connected with it a rod, Q, the other end of which carries a pawl or hook, s, which is adapted to engage with the teeth of the gear-wheel F. The lever P, once in twenty-four hours, is forced back by the projection r, and draws upon its rod Q and pawl s to engage with and turn the wheel F one tooth. The wheel, having three hundred and sixty-five teeth, is turned completely once a year. A spring returns the lever P after the projection r relieves it.

I will now describe the manner in which I work the globe to utilize the mechanism I have heretofore described.

It is unimportant what may be the relative positions of the series of divisions I mark; but I will show them as follows, (see Fig. 4:) In the highest circumferential space upon the flange a, I mark off twelve divisions, the spaces of which, united, pass around the flange. In these divisions I put the names of the months consecutively. In the next space I mark off around the flange three hundred and sixty-five lines representing days, and mark each by numbers up to twenty-eight, thirty, or thirty-one, as the particular month calls for. In the next space I indicate, by letters and a cross for Sunday, M, T, W, T, F, S, ×, M, &c., the days of the week; in the next the time of sunrise, and the next the time of sunset. These will preferably be above slot e. Below it, upon and around flange c, I mark, in the order named, the length of day, sun fast, sun slow, and around the base or ring C, I mark the twelve signs of the zodiac in twelve equal divisions. For each of these series I have a pointer, h. It is obvious that in order to prevent interference in the position of these pointers I must properly arrange the series. Each series is entirely independent of the others. The months will commence with January at a certain point upon the flange. To this month a finger or pointer, h, will be directed. The next series—namely, the days of the month—will commence farther on upon the flange a sufficient distance to allow another pointer to be directed to it without interfering with the first one. The numbers at the commencement of this series will commence with one and run up to thirty-one—the number of days in January. The next will run up to twenty-eight, to indicate February; the next thirty-one, for March, and thirty, for April, and so on around to the point of beginning. The next series—the days of the week—will commence farther on to allow another finger or pointer to be directed to it, and so on throughout the entire series a pointer will be directed to each. These various marks may readily be found in an almanac, and the series may be taken therefrom and arranged in proper order. Each pointer is properly placed at the starting-point of each series. Thus, when the first pointer is directed to January, the next will be directed to the figure 1 at the beginning of its series, the next to the day of the week upon which the first of January falls, the next to the figure representing time of sunrise upon that day, and so on throughout. At midnight the gear-wheel F is turned one tooth, as before explained. This turns shaft E, with its disk G, carrying arms g, with their pointers h, which are shifted forward one place, the first still pointing to January, the second to the number 2, the third to the next day of the week, and so on. Thus in three hundred and sixty-five days the pointers complete their rounds, having gone through each series. If one wishes to know in what sign of the zodiac the sun is upon that day, he observes the pointer directed to that series, and he can tell at once in what sign he will be upon any day by comparing the series, which are all set forth plainly before him. On account of the unequal division of three hundred and sixty-five days by seven—the number constituting the week—the series would be thrown out of order at the completion of the year. To provide for this I have the adjustment of the pointers, which upon the first of January may be set in proper relation with each other to again begin their travel. For leap-year I have not specially provided, deeming it best for the sake of economy to dispense with the complicated gearing necessary to regulate the device in this respect, and considering that once in four years the device may be readjusted in any practical manner. The clock K furnishes the time of the place where located.

The globe A is a terrestrial one, having the continents and oceans, &c., and the lines of latitude and longitude, the ecliptic, and whatever other characters and lines which are usually formed upon globes. The sun's position in the ecliptic may readily be determined by the point in the zodiac.

The cap I is marked upon its outer rim or face with the hours and with characters denoting midnight, midday, ante and post meridian. The object of this is to determine the time, whether day or night, at any portion of the globe. To do this I have drawn upon the globe, from the principal cities, fine lines $w$ (preferably colored differently) to the north pole, or as far in that direction as possible—that is, to the figured cap I. These lines correspond in direction to the longitudinal lines, and terminate at the point upon the cap, which indicates the time of the place from which they start. The revolution of the cap by means of the shaft H and the power-clock K in twenty-four hours provides for passing time, and always brings the proper figures to indicate the time at the place sought.

The alarm mechanism may be used for a variety of purposes; but as I have specially intended the device for the use of schools I will explain its advantage in this respect. It may be used for indicating recess and its termination, and for beginning or closing school, its automatic action rendering it accurate and effective. By raising the cap I from the globe the platinum points $m$ may be placed in any desired position, as indicated by the time-divisions upon plate L, and any number of them may be inserted for a variety of purposes. Once set, they would need no change until the object in view changed. The rollers $b$ upon track B allow the entire globe to be turned when necessary.

The whole device can be made at little cost. Its accuracy and simplicity in operation and its adaptability to be readily explained and understood render it particularly serviceable for the purpose intended.

Having thus described my invention, what I claim as new, and desire to secure by Letters Patent, is—

1. A hollow globe or vessel having a circumferentially-slotted base, and provided with a calendar upon its face, in combination with a pointer or pointers fitting from within through the slot of the globe and directed to said calendar, and a power mechanism to cause said pointer or pointers to travel over the face of the calendar, substantially as and for the purpose described.

2. The hollow globe or vessel A, having a base-flange, $a$, the ring C, with its flange $c$, and the separating and supporting arms D, whereby a circumferential slot, $e$, is formed between the edge of the flanges $a$ and $c$, the outer faces of said flanges being provided with a series of marks and lines denoting a calendar, as shown, in combination with the revolving plate G, with its arms $g$ projecting through slot $e$, pointers $h$, directed to the calendar-shaft E, and a power mechanism to revolve said plate G, substantially as and for the purpose herein described.

3. The hollow globe or vessel A, having a circumferentially-slotted base and series of lines and figures denoting a calendar upon it, as shown, in combination with the pointers $h$ upon arms $g$, fitting from within through slot $e$, the revolving disk G, shaft E, and gear-wheel F, having three hundred and sixty-five teeth, and a power mechanism for automatically turning said gear F one tooth in twenty-four hours, to cause the pointers to travel over the extent of the calendar in one year, substantially as and for the purpose herein described.

4. The hollow globe or vessel A, having a circumferentially-slotted base and series of lines and figures denoting a calendar upon its face, as shown, in combination with the adjustable pointers $h$ upon arms $g$, fitting from within through slot $e$, the revolving disk G, shaft E, and gear-wheel F, having three hundred and sixty-five teeth, and the means for turning said gear F one tooth in twenty-four hours, consisting of the clock mechanism K, with its spring-drum O, having a projection, $r$, upon it, lever P, rod Q, and pawl S, substantially as herein described.

5. The hollow globe or vessel A, having a circumferentially-slotted base and provided with independent series of figures and lines, starting at different points upon the face of the globe or vessel and thence passing around it, and denoting the various events of the calendar for a year, in combination with the revolving disk G, having the arms $g$, carrying pointers $h$, passing from within through the slot $e$, and placed around the rim of the disk in positions each to indicate its own series upon the calendar, the shaft E, gear-wheel F, having three hundred and sixty-five teeth, and a power mechanism for automatically turning said gear F one tooth in twenty-four hours, to cause the pointers to travel over the extent of the calendar in one year, substantially as herein described.

6. The hollow globe or vessel A, having upon its face the delineation of the earth's surface, in combination with the revolving cap I, having time-divisions upon its face, as shown, and a power mechanism to cause said cap to make a complete revolution once in twenty-four hours, substantially as and for the purpose herein described.

7. The hollow globe or vessel A, having upon its face the delineation of the earth's surface, and the guiding-lines $w$, in combination with the cap I, having time-divisions upon its face, and the means for causing said cap to make one complete revolution in twenty-four hours, consisting of the shaft H, journaled in the base of the globe or in a suitable standard or step therein, bevel-gear J, pinion $k$, and the clock mechanism K, substantially as herein described.

8. The hollow globe or vessel A, as herein shown, in combination with the revolving plate L upon shaft H, within the globe, and driven by a clock mechanism, said plate having time-divisions upon its surface, as on the dial of a clock, and provided with holes $l$ for the insertion of metallic points, a battery and alarm mechanism, connected by wires with each other and with plate L, and forming the circuit through said plate by means of a point in the circuit with which the points of plate L come in contact in their revolution, substantially as and for the purpose herein described.

9. The hollow globe or vessel A, central shaft, H, plate L, with its time-divisions and metallic points m, alarm N, battery M, with its metallic point o, circuit-wires p and q, and the means for turning said plate L once in twenty-four hours, consisting of the gear J, pinion k, and clock mechanism K, substantially as and for the purpose herein described.

In witness whereof I have hereunto set my hand.

ANDREW JACKSON.

Witnesses:
G. W. EMERSON,
L. H. NOURSE.